3,288,612
PHOTOGRAPHIC EMULSION OF SILVER HALIDE
Yoshihide Hayakawa, Kosaiji, Minamiashigara-machi, Ashigarakami-gun, Kanagawa-ken, Japan, assignor to Fuji Photo Film Co., Ltd., Kanagawa-ken, Japan, a corporation of Japan
No Drawing. Filed Nov. 27, 1962, Ser. No. 240,453
Claims priority, application Japan, Dec. 26, 1961, 36/47,419
4 Claims. (Cl. 96—114)

This invention relates to a photographic emulsion of silver halide and more particularly to a emulsion providing the image of high edge-gradient.

The ratio of change in density to distance at the boundary between the darkened and the undarkened parts of the photographic image is called "edge-gradient." In general, the higher the edge-gradient, the sharper the image. In order to obtain the photographic image of high edge-gradient when a photographic emulsion of silver halide is employed, a special developing solution which contains a small amount of sulfites, has a high pH value, and contains hydroquinone as developer, has been employed (for example, ref. Yule J.A.C. "Formaldehyde-Hydroquinone Developers and Infectious Development" J. Frank, Inst. 239 221 (1945)).

It is the object of this invention to provide photographic emulsions which can give the highly contrasted image when the developing solution of this type is used. Photosensitive materials prepared from such emulsion are suitable for producing halftone-dot by means of glass screen or contact screen.

It is well known that the addition of derivatives of alkylene oxide, such as the addition polymer of 1 mole of sorbitan monolaurate and 20 moles of ethylene oxide, to the emulsion results in the increase in contrast of image (ref. U.S.P. No. 2,400,532). However, since the addition of alkylene oxide also results in the remarkable decrease in the rate of development, it is necessary to extend the time of development in order to attain the sufficient contrast. Therefore, when the development is carried out for a relatively short time employed usually (for 2 to 3 minutes), the decrease in sensitivity is remarkable and the halftone-dots having sharp edge cannot be obtained. Accordingly, it is the object of this invention to produce the superior halftone dots after a relatively short time of development by increasing the contrast and the edge-gradient.

The above-mentioned object can be attained by adding both (1) derivatives of polyalkylene oxide and (2) at least one compound selected from the group consisting of lysine, ornithine, arginine and their salts, and N-[(dialkylamino)alkyl] carbamates represented by the following structural formula:

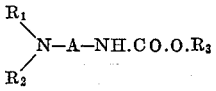

and their salts. In this structural formula, $R_1$, $R_2$ and $R_3$ represent alkyl group, and A represents alkylene group. Moreover, the total number of carbon atoms contained in $R_1$, $R_2$, $R_3$ and A is not less than 9, and $R_1$ and $R_2$ may combine to form a ring.

Any type of derivatives of polyethylene oxide can be employed in this invention. That is, the condensation products of alkylene oxides with a compound selected from the group consisting of water, aliphatic alcohols, glycols, fatty acids, aliphatic amines, phenols and hexitol ring dehydration products can be employed. In any case polyalkylene oxides and their derivatives must have a molecular weight of more than 400, preferably between 800 and 6,000. Lysine, ornithine, or arginine are amino-acids. In this invention, both the product obtained from natural substances by the decomposition of protein, and that obtained by synthesis can be employed.

The structural formulas of these amino-acids are given below.

Lysine (hydrochloride):

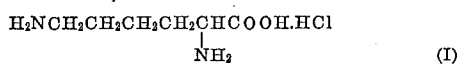
(I)

Ornithine (hydrochloride):

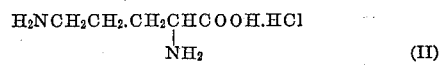
(II)

Arginine (hydrochloride):

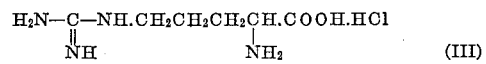
(III)

Examples of N-[(dialkylamino)alkyl]carbamates employed in this invention are as follows:

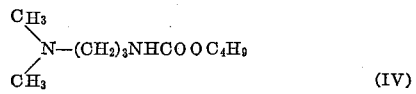
(IV)

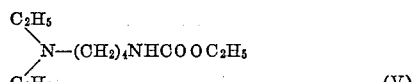
(V)

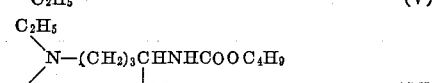
(VI)

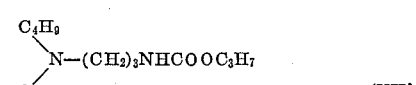
(VII)

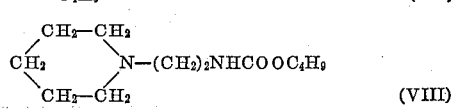
(VIII)

Compounds (IV) to (VIII) can be obtained by dehydrochlorination of N,N-dialkyl- or N,N-polymethylene-aminoalkylamine and chlorocarbonic ester.

The most useful amount of compounds in this invention may be varied according to the sort of emulsion, however, it is preferable to add the compounds in a proportion of 10 mg. to 1 g. of polyalkylene oxide and from 0.1 g. to 10 g. of lysine, ornithine, arginine, N-[(dialkylamino)alkyl]carbamates, or their salts to 1 mole of silver halide.

Photographic emulsions are prepared in the following three stages: (1) The emulsification and digestion (first ripening) of the silver halide, (2) removal of excess of salts by washing with water and the like, (3) second digestion (after ripening) to increase the sensitivity.

The compounds mentioned above may be added to the emulsion at any stage. The derivatives of alkylene oxide are added before or after the addition of lysine, ornithine, arginine or N-[(dialkylamino)alkyl]carbamates, but the most preferable result is obtained when the compounds are added after second digestion but before coating. The compounds are dissolved in the solvents that have no detrimental effect on the emulsion, for example, water, lower alcohols such as methanol and ethanol, ketones such as acetone, and added to the emulsion.

The photographic emulsion that can be employed in this invention is that of silver chloride, silver bromide, silver chlorobromide, silver iodobromide, or silver chloro-iodobromide. The emulsion of silver chlorobromide is most preferable.

The emulsion may be sensitized chemically by the well-known methods, for example, by the addition of unstable compounds containing sulfur such as ammonium thiosulfate, or allylthiourea (ref. P. Glafkide's, Chimie Photographique, 2éme Edition Photocinéma, 1957 p. 297, Paul Montel, Paris), and/or compounds of gold such as a complex of mono-valent gold and thiocyanic acid (ref. ibid, p. 301). The emulsion also may be optically sensitized by the addition of sensitizing dyes such as cyanine dyes, or merocyanine dyes (for example, ref. Shinichi Kikuchi et al. "Handbook of Scientific Photograph," 1959, pp. 15–24, Maruzen, Tokyo). The emulsion may be stabilized by the addition of heterocyclic compounds such as benzotriazole, 1-phenyl-5-mercaptotetrazole, 4-hydroxy-1,3,3a,7-tetrazaindene.

Example 1

Four samples were prepared by adding the addition polymer (VIII), made from 1 mole of oleyl alcohol and 30 moles of ethylene oxide, and lysine hydrochloride (I) to an orthochromatic emulsion of silver chlorobromide which contains the optimum amounts of sensitizing dye and hardening agent, 30 mole percent of silver bromide, and gelatin in a proportion of 105 g. of gelatin to 1 mole of silver halide. The amounts of polymer and lysine were as follows:

| Sample | Amount of (VIII) | Amount of (I) |
|---|---|---|
| | (G./1 mole of silver halide) | |
| (i) | 0 | [1] 0 |
| (ii) | 0.23 | 0 |
| (iii) | 0 | 6.3 |
| (iv) | 0.23 | 6.3 |

[1] Reference.

These emulsions were coated on film bases, and then sensitometry and evaluation of halftone-dot were carried out.

In sensitometry a tungsten lump (2666° K.) was employed as a light source and a optical step wedge was used to vary the exposure. Development was carried out at 20° C. using the developing solution having the following composition:

Water (about 30° C.) _____ cc__ 500
Sodium sulphate (anhydrate) _____ g__ 300
Para-formaldehyde _____ g__ 7.5
Sodium bisulfite _____ g__ 2.2
Boric acid _____ g__ 7.5
Hydroquinone _____ g__ 22.5
Potassium bromide _____ g__ 1.6
Additional water _____ Balance
Total _____ liters__ 1

Evaluation of halftone-dot was carried in the following way. During exposure, a commercial magenta contact screen (150 lines) was placed in close contact to the sample film, which was exposed and developed in the same way as in case of sensitometry. The halftone-dot formed was observed by a microscope. The dot was evaluated and classified according to the sharpness of dot edge into five classes A, B, C, D and E, of which A is the sharpest.

Results of 1′30″, 2′15″ or 3′ development at 20° C. are summarized in the following table.

| Sample | Relative Sensitivity | | | Contrast [1] | | | Evaluation of dot | | |
|---|---|---|---|---|---|---|---|---|---|
| | 1′30″ | 2′15″ | 3′ | 1′30″ | 2′15″ | 3′ | 1′30″ | 2′15″ | 3′ |
| (i) | 26 | 65 | 100 | 4.1 | 7.4 | 7.7 | D | B | C |
| (ii) | 11 | 21 | 55 | 2.1 | 3.3 | 5.1 | E | D | B |
| (iii) | 62 | 81 | 103 | 7.5 | 7.2 | 6.4 | A | C | D |
| (iv) | 28 | 55 | 91 | 5.3 | 8.5 | 7.9 | B | A | B |

[1] Average slope between a point of base density plus fog density plus 0.1 and a point of base density plus fog density plus 2.1 in the characteristic curve.

As seen from the table, (iv) gives the sharpest dot of highest contrast in a wide range of time of development.

Example 2

Four samples were prepared in the same way as in Example 1 by adding polypropyleneglycol bis (polyethyleneglycol) ether (IX) which had a molecular weight of about 2,000 and contained propylene group and ethylene group in a proportion of 30 of the former to 8 of the latter in number, and/or N-[(dialkylamino)alkyl]carbamates (VI) mentioned above to the emulsion. The amounts of agents (IX) and (VI) per 1 mole of silver halide were as follows:

| Sample | Amount of (IX) | Amount of (VI) |
|---|---|---|
| | (G./1 mole of silver halide) | |
| (i) | 0 | [1] 0 |
| (ii) | 20 | 0 |
| (iii) | 0 | 3.8 |
| (iv) | 20 | 3.8 |

[1] Reference.

Results of tests are summarized in the following table.

| Sample | Relative Sensitivity | | | Contrast | | | Evaluation of dot | | |
|---|---|---|---|---|---|---|---|---|---|
| | 1′30″ | 2′15″ | 3′ | 1′30″ | 2′15″ | 3′ | 1′30″ | 2′15″ | 3′ |
| (i) | 26 | 65 | 100 | 4.1 | 7.4 | 7.7 | D | B | C |
| (ii) | 13 | 22 | 60 | 1.9 | 2.7 | 4.8 | E | D | B |
| (iii) | 33 | 78 | 105 | 7.5 | 7.0 | 6.5 | A | C | D |
| (iv) | 33 | 56 | 85 | 4.0 | 8.2 | 8.0 | B | A | A |

As seen from the table, (iv) gives the sharpest dot of highest contrast.

Example 3

Four samples were prepared in the same way as in Example 1 by adding the addition polymer (X), made from 1 mole of nonyl phenol and about 4 moles of ethylene oxide, and/or hydrochloric salt of arginine (III), to the emulsion of silver halide. The amounts of compounds (X) and (III) per 1 mole of silver halide were as follows:

| Sample | Amount of (X) | Amount of (III) |
|---|---|---|
| | (G./1 mole of silver halide) | |
| (i) | 0 | [1] 0 |
| (ii) | 57 | 0 |
| (iii) | 0 | 4.2 |
| (iv) | 57 | 4.2 |

[1] Reference.

Results of tests are summarized in the following table.

| Sample | Relative Sensitivity | | | Contrast | | | Evaluation of dot | | |
|---|---|---|---|---|---|---|---|---|---|
| | 1′30″ | 2′15″ | 3′ | 1′30″ | 2′15″ | 3′ | 1′30″ | 2′15″ | 3′ |
| (i) | 35 | 69 | 100 | 4.9 | 7.5 | 5.7 | D | B | C |
| (ii) | 85 | 25 | 58 | 1.8 | 4.9 | 5.9 | E | C | B |
| (iii) | 82 | 94 | 105 | 7.3 | 5.8 | 5.5 | A | C | D |
| (iv) | 45 | 73 | 100 | 7.8 | 7.7 | 6.3 | A | B | C |

As seen from the table, (iv) gives the sharpest dot of highest contrast.

What is claimed is:
1. A light sensitive silver halide emulsion from which an image of high edge gradient may be obtained, said emulsion having the improvement which comprises the incorporation therein of an uniformly dispersed therein agent producing said effect and consisting of (1) the condensation products of alkylene oxides with a compound selected from the group consisting of water, aliphatic alcohols, glycols, fatty acids, aliphatic amines, phenols, and hexitol ring dehydration products and (2) at least one compound selected from the group consisting of lysine, ornithine, arginine and their mineral acid salts, carbamates represented by the following structural formulas:

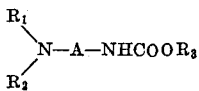

and

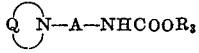

wherein $R_1$, $R_2$ and $R_3$ each represents an alkyl group, A and Q each represent an alkylene group, and the total number of carbon atoms contained in the carbamate is not less than 10, and their mineral acid salts.

2. A photographic emulsion as described in claim 1 wherein the compounds of said agent are present in the proportion of 10 mg. to 1 g. of said condensation products of alkylene oxides, and 0.1 g. to 10 g. of said second group of compounds for each 1 mole of silver halide in said emulsion.

3. A photographic emulsion as described in claim 1 wherein said carbamate is selected from the group consisting of the following carbamates and their mineral acid salts:

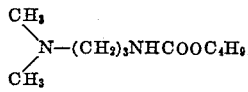

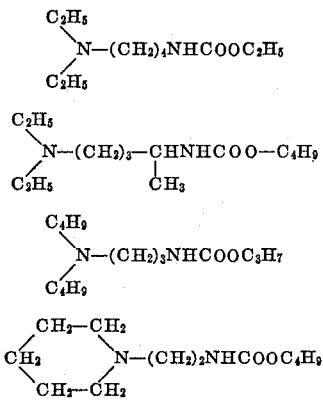

4. A photographic emulsion as described in claim 1 wherein said polyalkylene oxide condensation product has a molecular weight ranging from 400 to 6,000.

References Cited by the Examiner
UNITED STATES PATENTS
3,062,647  11/1962  Herz _____ 96—114

OTHER REFERENCES

Birr, Chemical Abstracts, vol. 53, 1970 (1959).
Furuseki, Chemical Abstracts, vol. 48, 7466 (1954).
Mees, "The Theory of the Photographic Process," pages 62–8, The MacMillan Co., N.Y. (1942).

NORMAN G. TORCHIN, *Primary Examiner.*

J. T. BROWN, *Assistant Examiner.*

UNITED STATES PATENT OFFICE
CERTIFICATE OF CORRECTION

PATENT NO. : 3,288,612
DATED : Nov. 29, 1966
INVENTOR(S) : Yoshihide Hayakawa

It is certified that error appears in the above-identified patent and that said Letters Patent are hereby corrected as shown below:

Column 4, Example 2, line 20, change "20" to --- 0.020 ---
and line 22, change "20" to --- 0.020 ---

Column 4, Example 3, line 52, change "57" to --- 0.057 ---
and line 54, change "57" to --- 0.057 ---

Signed and Sealed this

Twentieth Day of July 1976

[SEAL]

Attest:

RUTH C. MASON
*Attesting Officer*

C. MARSHALL DANN
*Commissioner of Patents and Trademarks*